(12) United States Patent
Komori

(10) Patent No.: US 7,663,727 B2
(45) Date of Patent: Feb. 16, 2010

(54) DISPLAY DEVICE

(75) Inventor: Fumiaki Komori, Isumi (JP)

(73) Assignee: Hitachi Displays, Ltd., Chiba (JP)

( * ) Notice: Subject to any disclaimer, the term of this patent is extended or adjusted under 35 U.S.C. 154(b) by 373 days.

(21) Appl. No.: 11/644,830

(22) Filed: Dec. 26, 2006

(65) Prior Publication Data
US 2007/0146615 A1   Jun. 28, 2007

(30) Foreign Application Priority Data
Dec. 27, 2005   (JP)   ............... 2005-373649

(51) Int. Cl.
G02F 1/1345   (2006.01)
(52) U.S. Cl. .............. 349/151; 349/149; 349/150; 349/152
(58) Field of Classification Search ............. 349/151, 349/152
See application file for complete search history.

(56) References Cited

U.S. PATENT DOCUMENTS 5,748,179 A * 5/1998 Ito et al. .................... 349/152
6,532,055 B2 * 3/2003 Oishi ........................ 349/149
2003/0058208 A1 * 3/2003 Kawamura et al. ........... 345/87
2006/0077333 A1 * 4/2006 Imajo et al. ................ 349/149

FOREIGN PATENT DOCUMENTS

JP   06-013724   1/1994

* cited by examiner

Primary Examiner—David Nelms
Assistant Examiner—Thanh-Nhan P Nguyen
(74) Attorney, Agent, or Firm—Antonelli, Terry, Stout & Kraus, LLP.

(57) ABSTRACT

A display device includes a display panel; plural first semiconductor chips mounted on the periphery of a first side of a substrate forming the display panel in a first direction; and first power source wiring layer provided on the periphery of the first side substrate. A location of a bump electrode of the first semiconductor chip provided on one end in the first direction, the bump electrode being connected to the first power source wiring layer, is different from a location of a bump electrode of the first semiconductor chip provided on the other end in the first direction, the bump electrode thereof being connected to the first power source wiring layer.

14 Claims, 2 Drawing Sheets

DISPLAY DEVICE

CROSS-REFERENCE TO RELATED APPLICATIONS

The disclosure of Japanese Patent Application No. 2005-373649 filed on Dec. 27, 2005 including the specification, drawings and abstract is incorporated herein by reference in its entirety.

BACKGROUND

1. Field of the Invention

The present invention relates to a display device, particularly, a technology effective in application to a display device in a system that a digital signal is transferred between driving circuits.

2. Description of Related Arts

A TFT (thin film transistor) type liquid crystal display module is widely used as a display device for a notebook personal computer and such. The liquid crystal display module comprises a liquid crystal display panel formed by holding a liquid layer between two transparent substrates different in size and a driving circuit for driving the liquid crystal display panel.

As such a liquid crystal display module, known has been one in a system that a digital signal (display data or a clock, for example) is inputted only to the top of the cascaded driving circuits while a digital signal passes through driving circuits to be sequentially transferred to the other driving circuits (referred to as a digital signal sequential transfer system), as described in Japanese Patent Laid-open No. Hei 06-13724 (Patent Reference 1), for example.

In the liquid crystal display device described in Patent Reference 1, a semiconductor integrated circuit device (IC) forming a driving circuit is directly mounted to a transparent substrate (a glassboard, for example) forming the liquid crystal display panel. A power source voltage for each of gate drivers is supplied from a power source circuit through power source wiring provided on a substrate of the liquid crystal display panel.

In the case of supplying the power source wiring on the transparent substrate forming the liquid crystal display panel with current only from one side, the larger the size of the liquid crystal display panel is, the more the resistance of the power source wiring on the transparent substrate forming the liquid crystal display panel increases. For example, a fall of the voltage due to the resistance of the power source wiring causes unevenness of the power source voltage supplied to each gate driver.

The unevenness of the supplied power source voltage in the respective gate drivers causes a change in on-resistance of a thin film transistor (TFT), and thereby, unevenness of an image voltage written in each pixel electrode (ITO 1), so that unevenness in display occurs.

Accordingly, in the case of a liquid crystal display panel as large as or more than 12.1 inches in dimension, electric current is fed to the power source wiring on the transparent substrate forming the liquid crystal display panel from the both sides, using a circuit board, to stabilize a power source voltage supplied to each gate driver.

On the other hand, there has been a problem that the liquid crystal display module is largely required to be lowered in cost while the liquid crystal display module using the above-mentioned digital signal sequential transfer system is difficult to be further lowered in cost since a circuit board is expensive.

The invention is to solve the problems in the conventional technology. An object of the invention is to provide a technology enabling the cost of a display device to be reduced more than the conventional one.

The above-mentioned and other objects and new characteristics of the invention will be disclosed on the basis of the description and attached drawings of the specification.

SUMMARY

Brief description of an outline of represented parts of the invention disclosed in the application is as follows.

(1) A display device comprises a display panel; plural first semiconductor chips mounted on the periphery of a first side of a substrate forming the display panel in a first direction; and a first power source wiring layer provided on the periphery of the first side of the substrate, and in the display device, a location of a bump electrode of the first semiconductor chip provided on one end in the first direction, the bump electrode connected to the first power source wiring layer, is different from a location of a bump electrode of the first semiconductor chip provided on the other end in the first direction, the bump electrode connected to the first power source wiring layer.

(2) The display device according to (1) further comprises: plural second semiconductor chips mounted on the periphery of a second side adjacent to the first side of a substrate forming the display panel in a second direction; and a second power source wiring layer provided on the periphery of the second side of the substrate, and in the display device, a location of a bump electrode of the second semiconductor chip provided on one end in the second direction, the bump electrode connected to the second power source wiring layer, is different from a location of a bump electrode of the second semiconductor chip provided on the other end in the second direction, the bump electrode connected to the second power source wiring layer.

(3) In the display device according to (1) or (2), the respective semiconductor chips comprise: an inner power source wiring layer; plural bump electrodes connected to the inner power source wiring layer; and plural resistance layers provided between the inner power source wiring layer and the respective bump electrodes wherein the plural resistance layers include at least two resistance layers having different resistance values.

(4) The display device according to any one of (1) to (3) further comprises a power source circuit, and in the display device, a location of a bump electrode of each semiconductor chip, the bump electrode connected to the power source wiring layer, is determined in accordance with a distance from the power source circuit.

(5) In the display device according to any one of (1) to (4), the display panel is 12.1 inches or more in dimension.

(6) In the display device according to any one of (1) to (5), the display panel is a liquid crystal display panel, the fist semiconductor chip is a gate driver and the second semiconductor chip is a drain driver.

An effect achieved by the represented parts of the invention disclosed in the application is briefly described as follows.

In accordance with a display device according to the invention, it becomes possible to make a reduction in cost more than a conventional device.

BRIEF DESCRIPTION OF THE DRAWINGS

The invention will be described with reference to the accompanying drawings, wherein like numbers reference like elements, and wherein.

DETAILED DESCRIPTION OF THE INVENTION

An embodiment of the invention will be described in detail hereinafter, made reference to drawings.

In all the drawings illustrating the embodiment, what has the same function is marked with the same signs and numerals and repeated description thereof will be omitted.

[Liquid Crystal Display Module in a Digital Signal Sequential Transfer System Prerequisite to the Invention]

First, described will be a liquid crystal display module in a digital signal sequential transfer system prerequisite to the invention.

Figure 3:
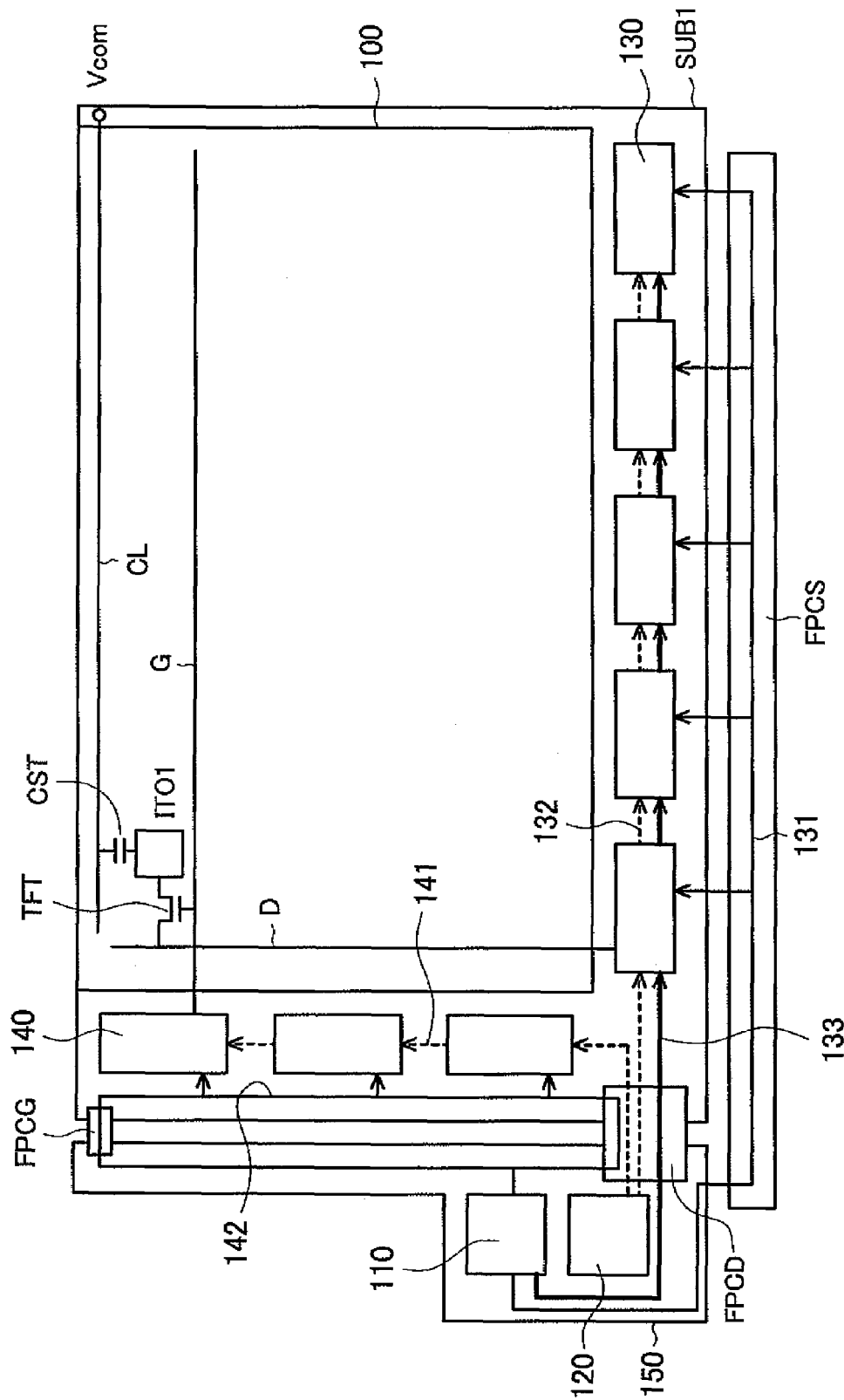
FIG. 3 is a block diagram showing a basic structure of a conventional liquid crystal display module using a digital signal sequential transfer system.

FIG. 3 is a block diagram showing a basic structure of a conventional liquid crystal display module using the digital signal sequential transfer system.

In order to form a liquid crystal display panel 100, the TFT substrate on which a pixel element ITO1, a thin film transistor (TFT) and such are formed and a filter substrate on which an opposite electrode, a color filter and such are formed are superimposed with a predetermined interval therebetween to be stuck on each other by means of a sealing member provided in the shape of a frame in the vicinity of a circumferential edge between the both substrates, liquid crystal is put to the inside of the sealing member between the both substrates from a liquid crystal enclosing entrance provided at a part of the sealing member to be enclosed and polarizers are stuck on the outsides of the both substrates.

Each sub pixel includes a pixel electrode ITO1 and a thin film transistor (TFT) and is provided so as to correspond to a part where plural scanning lines (or gate lines) G and an image line (or a drain line, a source line) D intersect each other.

In an example shown in FIG. 3, holding capacity CST is provided for every picture for the purpose of holding a potential of the pixel electrode ITO1. CL denotes a capacity line for supplying the holding capacity CST with a reference voltage Vcom.

Further, in FIG. 3, shown is only one pixel electrode ITO1. The pixel electrode ITO1, the thin film transistor (TFT) and the holding capacity CST, however, are provided in plural numbers into the shape of a matrix. A scanning line G of a preceding line may be substituted for the capacity line CL.

A source of the thin film transistor (TFT) of each pixel is connected to the pixel electrode ITO1. A drain of the same is connected to the image line D. A gate of the same is connected to the scanning line g. The thin film transistor (TFT) functions as a switch for supplying the pixel electrode ITO1 with a display voltage (a gray scale voltage).

In the conventional liquid crystal display module shown in FIG. 3, a drain driver 130 and a gate driver 140 are mounted on the periphery of two sides of a substrate (a glass board, for example) forming the TFT substrate of a liquid crystal display panel 100 (SUB 1), respectively.

A power source circuit 110 and a timing controller 120 are respectively mounted on a circuit board 150 provided on the periphery of the liquid crystal display panel 100.

The timing controller 120 is formed from one semiconductor integrated circuit (LSI) to control and drive the drain driver 130 and the gate driver 140 on the basis of respective display controlling signals of a clock signal, a display timing signal, a horizontally synchronizing signal and a vertically synchronizing signal and display data (R, G and B), which are sent from a main body side of a computer.

A digital signal (such as display data and a clock signal) 132 sent from the timing controller 120 and a gray scale reference voltage 133 supplied from the power source circuit 110 are inputted to the top drain driver 130 through a flexible printed wiring board (simply referred to as a FPC substrate, hereinafter) (FPCD), and then, transmitted through an inner signal line in each drain driver 130 and a transmittance line path between the respective drain drivers 130 (a wiring layer on a glass board) to be inputted to each drain driver 130.

Further, a power source voltage of each drain driver 130 is supplied from the power source circuit 110 through a supply line 131 on a FPC substrate (FPCS), respectively.

Similarly, a digital signal (such as a clock) 141 sent from the timing controller 120 is inputted to the top gate driver 140 through the FPC substrate (FPCD), and then, transmitted through an inner signal line in each gate driver 140 and a transmittance line path between the respective gate drivers 140 (a wiring layer on a glass board) to be inputted to each gate driver 140.

A power source voltage of each gate driver 140 is supplied from the power source circuit 110 through a power source wiring 142 on a substrate of the liquid crystal display panel 100.

In FIG. 3, a FPC substrate (FPCG) is provided and the both ends of the power source wiring 142 on the transparent substrate forming the liquid crystal display panel 100 are connected to the power source circuit 110 so as to feed current from the both sides of the power source wiring 142 in order to stabilize the power source voltage supplied to each gate driver 140.

A basic structure of the liquid crystal display module in accordance with the embodiment of the invention is same as that of the conventional liquid crystal display module shown in FIG. 3.

Figure 2:
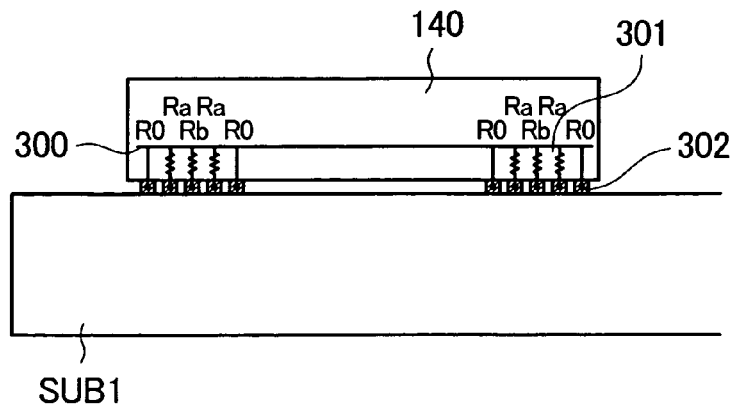
FIG. 2 is a sectional view illustrating an inner power source wiring layer, a resistance layer and a bump electrode of a gate driver in accordance with an embodiment of the invention.

FIG. 2 is a sectional view illustrating an inner power source wiring layer, a resistance layer and a bump electrode of the gate driver 140 in the embodiment.

As shown in FIG. 2, in the gate driver 140 in the embodiment, provided are plural bump electrodes (10 bump electrodes in FIG. 2) 302 connected to an inner power source wiring layer 300 while plural resistance layers 301 are provided between the inner power source wiring layer 300 and the respective bump electrodes 302.

The resistance layer 301 is formed so as to include at least two resistance layers having different resistance values. FIG. 2 shows a case that the resistance layer 301 is formed from three resistance layers having a resistance value R0, a resistance value Ra and a resistance value Rb (wherein R0<Ra<Rb).

Figure 1:
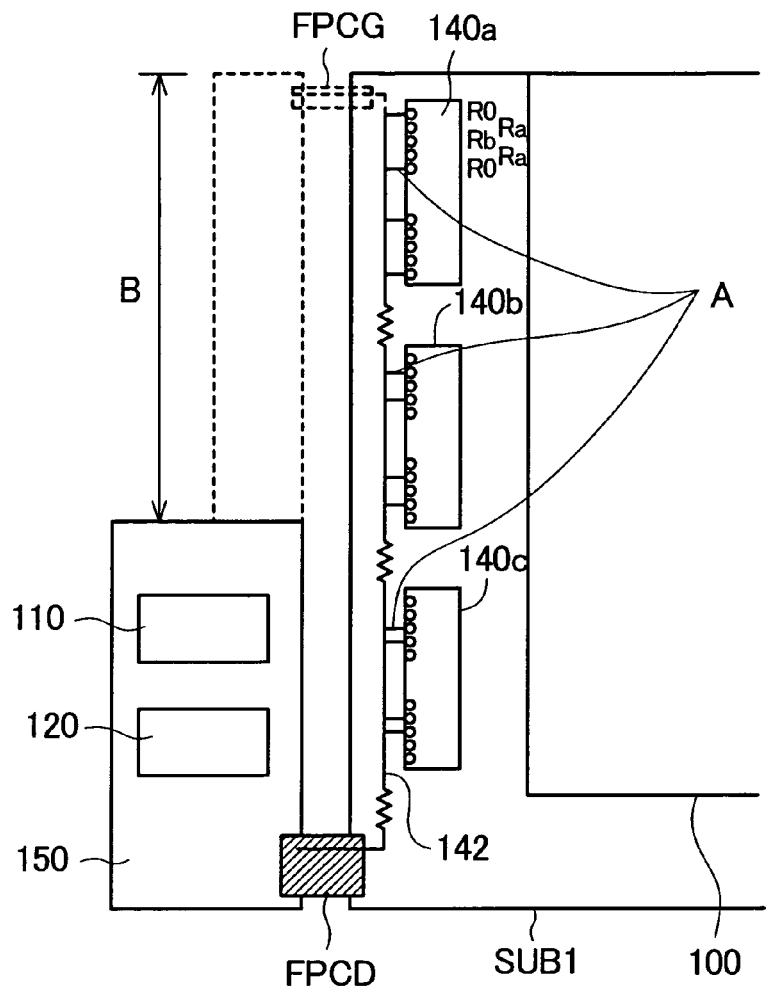
FIG. 1 illustrates a basic structure of a liquid crystal display module using a digital signal sequential transfer system in accordance with an embodiment of the invention.

FIG. 1 illustrates a basic structure of a liquid crystal display module using the digital signal sequential transfer system in the embodiment.

As shown in FIG. 1, in the embodiment, used is the gate driver 140 illustrated in FIG. 2 to properly select the bump electrode 302 of the gate driver 140, which is connected to a power source wiring 142 on a substrate of the liquid crystal display panel 100. This allows a voltage value of a power source voltage supplied to each drain driver 140 to be an almost same voltage value even in the case of feeding current only from one side to the power source wiring 142 on a substrate of the liquid crystal display panel 100.

In FIG. 1, in a gate driver 140a located farthest from the power source circuit 110, the power source wiring 142 on a substrate of the liquid crystal display panel 100 is connected to the bump electrode 302 connected to the resistance layer 301 having the lowest resistance value R0, as shown by A.

In a gate driver 140c located nearest to the power source circuit 110, the power source wiring 142 on a substrate of the liquid crystal display panel 100 is connected to the bump electrode 302 connected to the resistance layers 301 having the resistance values Ra and Rb.

Furthermore, in a middle gate driver 140b, the power source wiring 142 on a substrate of the liquid crystal display panel 100 is connected to the bump electrode 302 connected to the resistance layer 301 having the second lowest resistance value Ra.

That is to say, in the embodiment, the bump electrode 302 of each gate driver 140 is selected so that a fall in voltage obtained by adding a fall in voltage due to wiring resistance of the power source wiring 142 and a fall in voltage due to the resistance layer 301 of each gate driver 140 would be substantially same in voltage value among the respective gate drivers 140 in the case of feeding current only from one side to the power source wiring 142 on a substrate of the liquid crystal display panel 100.

This allows a voltage value of the power source voltage supplied to the inner power source wiring layer 300 of each gate driver 140 to be substantially same even when the power source voltage supplied to each gate driver 140 is made uneven because of a fall in voltage due to wiring resistance of the power source wiring 142 in the case of feeding current only from one side to the power source wiring 142 on a substrate of the liquid crystal display panel 100.

Accordingly, unevenness in display, which is caused by unevenness in power source voltage supplied to each gate driver 140, can be prevented in the embodiment.

This makes feeding of current from the both sides unnecessary, and thereby, the FPC substrate (FPCG) unnecessary as shown by a broken line in FIG. 1 in the embodiment. Moreover, a circuit board 150 can be reduced in dimension, as shown by an arrow B and the broken line in FIG. 1, so that the cost can be reduced.

In the above description, described is a case that plural resistance layers 301 are provided between the inner part power source wiring layer 300 and the respective bump electrodes 302 in the gate driver 140 to supply the gate driver 140 with a power source voltage by feeding current from one side to the power source wiring 142 on a substrate of the liquid crystal display panel 100. The invention, however, is not limited to the above. It may be arranged that plural resistance layer be provided between the inner power source wiring layer and the respective bump electrodes in the drain driver 130 to supply the drain driver 130 with a power source voltage by feeding current from one side to the power source wiring on a substrate of the liquid crystal display panel 100.

Further, in the above description, described is an embodiment in which the invention is applied to a liquid crystal display device. The invention, however, is not limited to the above. The invention may be applied to an organic electroluminescent display device and the like.

The invention by the present inventor has been concretely described above on the basis of the embodiment. It is obvious, of course, however, that the invention is not limited to the above embodiment and may be variously modified within a range not deviating from the spirit of the invention.

Moreover, in a different point of view of the invention, picked out can be the following aspects of the invention.

The invention in the different point of view is a display device comprising: a display panel; and a circuit board provided with a power source circuit for supplying the display panel with a power source voltage, wherein the display panel has a display area as large as or more than 12.1 inches in dimension, plural gate drivers for controlling a drive of a gate of the display panel are provided on one side on a substrate forming the display panel so as to be aligned in accordance with a COG method, a supply line for supplying each of the plural gate drivers with a power source voltage from the power source circuit is provided on the substrate along the plural gate drivers and the supply line and the circuit board are connected on one side of the supply line through one flexible printed board.

Such a structure allows one-side current feeding of a power source voltage to a gate driver, which has been conventionally impossible in the case of a display area as large as or more than 12.1 inches in dimension, to be achieved, and thereby, the circuit board to be made small in dimension, so that a low-cast display device can be provided.

The display device has an effect of the invention so long as it includes three or more gate drivers. This means that, although the invention is effective, of course, even for a structure in which two gate drivers are provided, the more the number of the gate driver is, the more the invention is effective in the case of a display area as large as or more than 12.1 in dimension, 17 inches, for example, or a further larger display area such that the gate drivers fewer in number are insufficient.

In addition, in the display device, a location of an electrode of a gate driver nearest among the plural gate drivers to a side on which the flexible printed board is provided, the electrode connected to the supply line, is different from a location of an electrode of a gate driver farthest among the plural gate drivers from the side on which the flexible printed board is provided, the electrode connected to the supply line. This means that locations of electrodes of at least the gate drivers on the both ends are different and that a location of an electrode of the gate driver provided in the middle part is also changed in accordance with necessity.

In this aspect of the invention, the display device is also applicable to an organic electroluminescent device and such other than the liquid crystal display device.

The invention claimed is:

1. A display device comprising:
a display panel;
plural first semiconductor chips mounted on the periphery of a first side of a substrate forming the display panel in a first direction; and
a first power source wiring layer provided on the periphery of the first side of the substrate;
wherein a location of a bump electrode of the first semiconductor chip provided on one end in the first direction, the bump electrode connected to the first power source wiring layer, is different from a location of a bump electrode of the first semiconductor chip provided on the other end on the first direction, the bump electrode connected to the first power source wiring layer; and
wherein the respective first semiconductor chips comprise:
an inner power source wiring layer;
plural bump electrodes connected to the inner power source wiring layer; and plural resistance layers provided between the inner power source wiring layer and the respective bump electrodes;
wherein the plural resistance layers include at least two resistance layers having different resistance values.

2. The display device according to claim 1, further comprising:
plural second semiconductor chips mounted on the periphery of a second side adjacent to the first side of a substrate forming the display panel in second direction; and
a second power source wiring layer provided on the periphery of the second side of the substrate,
wherein a location of a bump electrode of the second semiconductor chip provided on one end in the second direction, the bump electrode connected to the second power source wiring layer, is different from a location of a bump electrode of the second semiconductor chip provided on the other end in the second direction, the bump electrode connected to the second power source wiring layer.

3. The display device according to claim 2, further comprising:
a power source circuit;
wherein a location of a bump electrode of each of the first and second semiconductor chips, the bump electrode thereof being connected to one of the first and second power source wiring layers, is determined in accordance with a distance from the power source circuit.

4. The display device according to claim 2, wherein the display panel is 12.1 inches or more in dimension.

5. The display device according to claim 2, wherein the display panel is a liquid crystal display panel.

6. The display device according to claim 5, wherein the first semiconductor chip is a gate driver, and the second semiconductor chip is a drain driver.

7. The display device according to claim 1, further comprising:
a power source circuit,
wherein a location of a bump electrode of each first semiconductor chip, the bump electrode connected to the power source wiring layer, is determined in accordance with a distance from the power source circuit.

8. The display device according to claim 1, wherein the display panel is 12.1 inches or more in dimension.

9. The display device according to claim 1, wherein the display panel is a liquid crystal display panel.

10. The display device according to claim 9, wherein the first semiconductor chip is a gate driver.

11. A display device comprising:
a display panel; and
a circuit board provided with a power source circuit for supplying the display panel with a power source voltage;
wherein the display panel has a display area as large as or more than 12.1 inches in dimension;
wherein plural gate drivers for controlling a drive of a gate of the display panel are provided on one side on a substrate forming the display panel so as to be aligned in accordance with a COG method;
wherein each of the plural gate drivers include at least one semiconductor chip;
wherein a supply line for supplying each of the plural gate drives with a power source voltage from the power source circuit is provided on the substrate along the plural gate drivers;
wherein the supply line and the circuit board are connected on one side of the supply line through one flexible printed board; and
wherein the respective semiconductor chips comprise:
an inner power source wiring layer;
plural bump electrodes connected to the inner power source wiring layer; and
plural resistance layers provided between the inner power source wiring layer and the respective bump electrodes;
wherein the plural resistance layers include at least two resistance layers having different resistance values.

12. The display device according to claim 11, wherein the gate driver is three or more in number.

13. The display device according to claim 12, wherein
a location of an electrode of a gate driver nearest among the plural gate drivers to a side that the flexible printed board is provided on, the electrode connected to the supply line, is different from a location of an electrode of a gate driver farthest among the plural gate drivers from the side that the flexible printed board is provided on, the electrode connected to the supply line.

14. The display device according to claim 11, wherein the display panel is a liquid crystal display panel.

* * * * *